United States Patent [19]
Perego

[11] 3,873,117
[45] Mar. 25, 1975

[54] FOLDABLE BABY CARRIAGE CONSTRUCTION

[76] Inventor: Giuseppe Perego, Via De Gasperi, 50, Arcore, Italy 20043

[22] Filed: Oct. 31, 1973

[21] Appl. No.: 411,206

[30] Foreign Application Priority Data
Jan. 24, 1973  Italy .................................. 20511/73

[52] U.S. Cl. .............. 280/36 B, 280/47.38, 297/48, 297/184
[51] Int. Cl. ............................................ B62b 11/00
[58] Field of Search ............. 280/36 R, 36 B, 47.38; 297/16, 48, 58, 184

[56] References Cited
UNITED STATES PATENTS
| | | | |
|---|---|---|---|
| 2,470,040 | 5/1949 | Mackin et al. ................ | 280/47.38 X |
| 3,556,546 | 1/1971 | Garner ............................ | 280/36 B |

Primary Examiner—David Schonberg
Assistant Examiner—Michael J. Forman
Attorney, Agent, or Firm—McGlew and Tuttle

[57] ABSTRACT

A baby carriage comprises an upper frame portion having two spaced apart tubular legs which converge upwardly and terminate in a handle. The handles include hook-shaped end portions forming cane-like ends which may be rotated into juxtaposition to facilitating the carrying of the baby carriage on the arm of a person. A lower frame portion having spaced apart legs is carried on a bracket which pivoted to the upper frame portion and a lower rear frame portion is carried on a bracket which is pivoted to the lower frame portion. Both the lower frame portion and the lower rear frame portion carry wheels for moving the baby carriage and they are held in an extended position by a hook-shaped member which is carried on the upper frame portion and which hooks over the projection of a bracket supporting the lower rear frame portion from the lower frame portion. A seat-forming fabric provided with an upper part which engages over the converging portions of the upper frame and is buttoned in position thereon. It includes a lower hard seat portion which extends horizontally and which is supported by side elements which are folded over and buttoned upon an outwardly extending rigid frame forming member which is pivoted on the lower frame portion and on a link which extends to the upper frame portion. Both the seat and the lower frame portion and the lower rear frame portion are foldable upwardly into juxtaposition with the upper frame portion to facilitate carrying of the carriage. The carriage also includes a fabric forming a closed top or parasol which includes an inner end which buttons over the upper frame and an outer end which overhangs the seat portion and provides a shade or covering. A lower foot receiving bag-like fabric member forms a foot portion for the occupant of the carriage which includes an opening which aligns with the front end of the seat portion and which includes side portions which engage upwardly and button to the covering or parasol portion. The construction is such that the parasol portion may fold upwardly against the upper frame portion along with the seat and the foot covering portion when the lower frame portion and the lower rear frame portions are folded into juxtaposition with the upper frame portion for carrying of the device on a person's arm.

7 Claims, 7 Drawing Figures

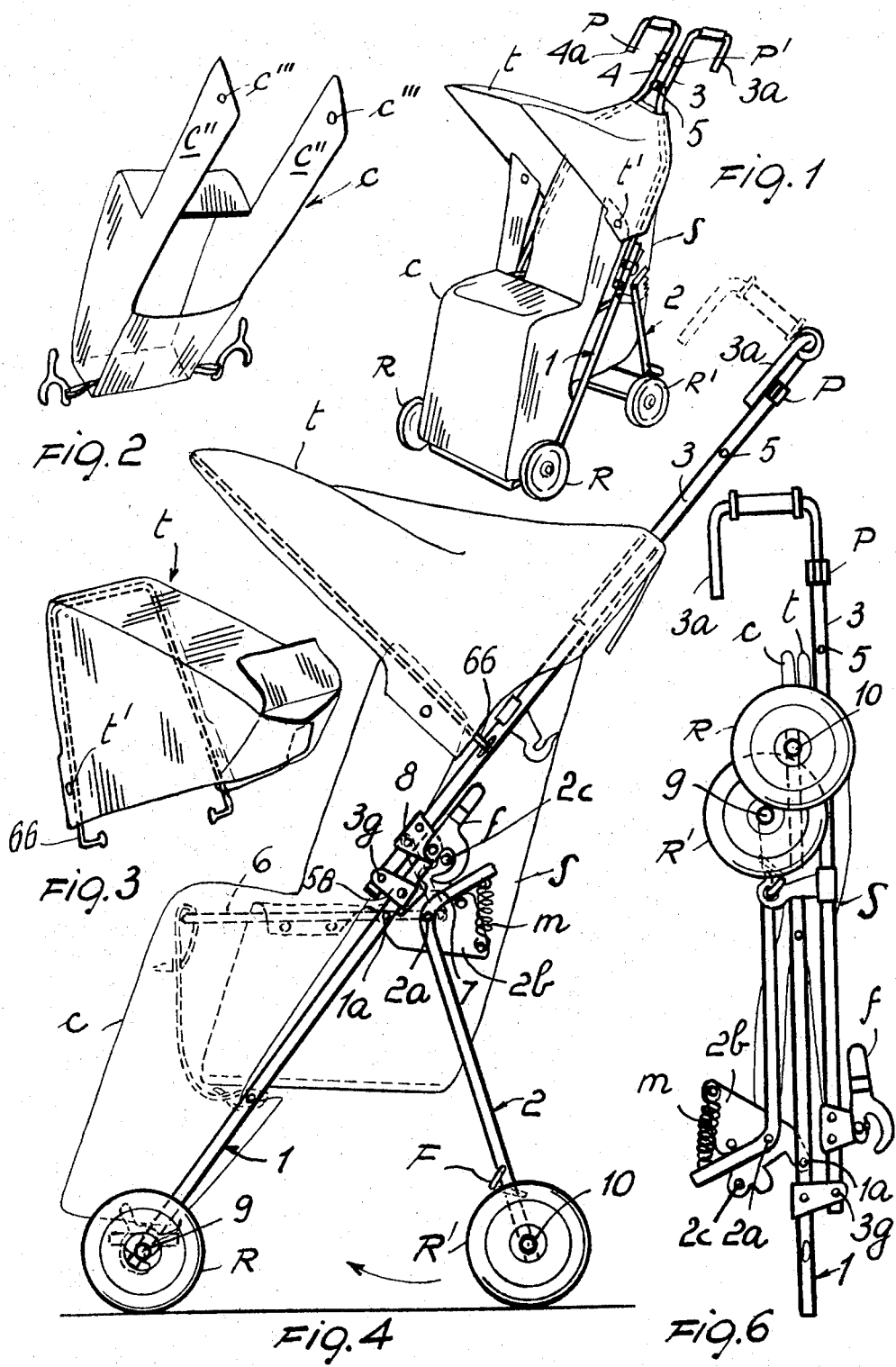

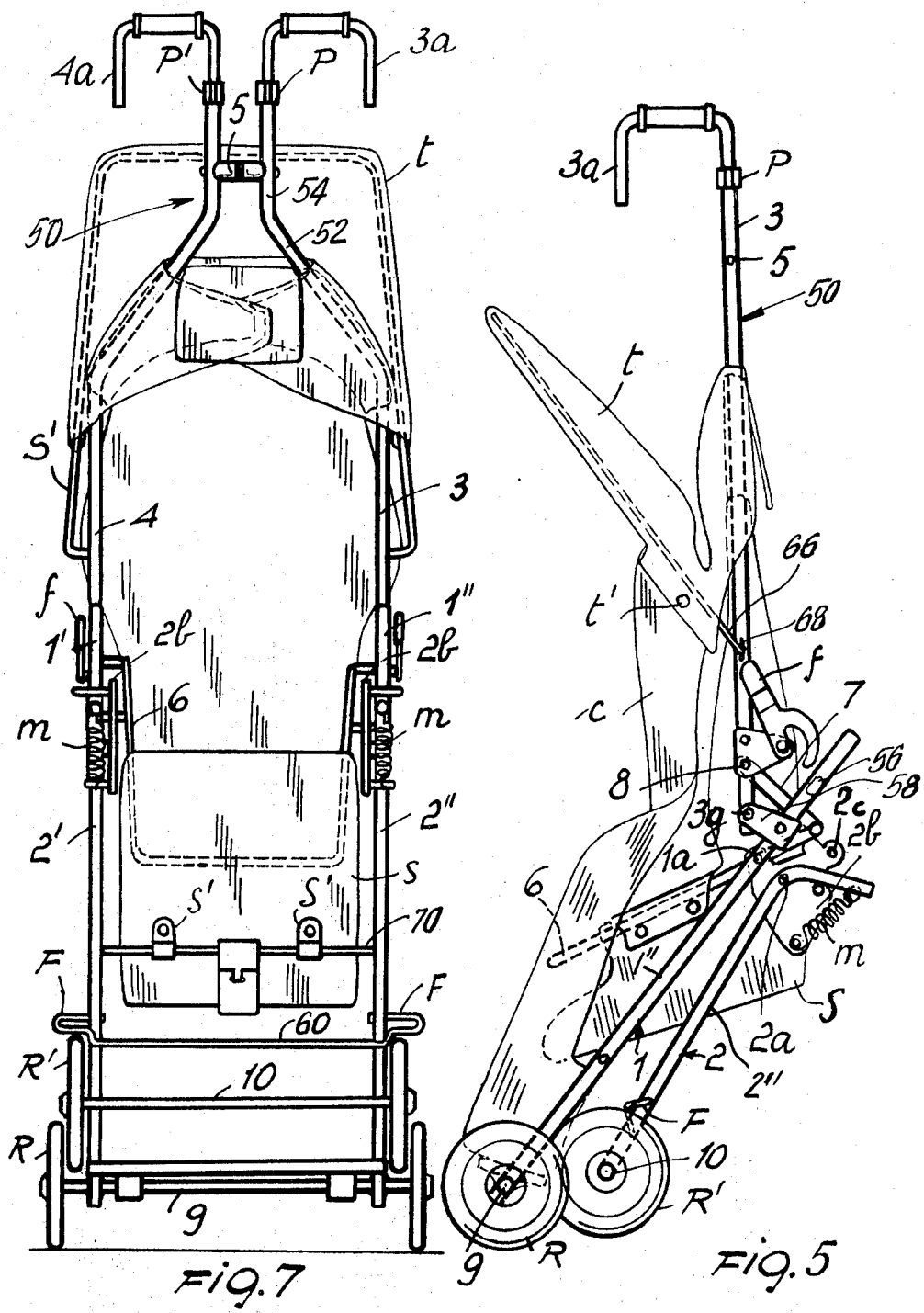

FOLDABLE BABY CARRIAGE CONSTRUCTION

BACKGROUND OF THE INVENTION

1. Field of the Invention

This invention relates in general to the construction of baby carriages and, in particular, to a new and useful foldable baby carriage which has a handle portion permitting it to be carried on a person's arm and which includes separate fabric elements forming a top parasol, a central seat portion and a lower foot receiving portion all of which are foldable alongwith the bottom frame portions against the upper frame portion.

2. Description of the Prior Art

Foldable and portable baby carriages are known but the known constructions are either very expensive or they do not have all of the features of an ordinary baby carriage and they do not provide portions for protecting of the baby therein which may be also folded into a compact shape for the purpose of carrying on a person's arm.

SUMMARY OF THE INVENTION

The present invention is an improvement over the prior art, particularly in the construction of an inexpensive frame assembly which includes a lower frame portion and a lower rear frame portion carrying the wheels which may be folded upwardly in respect to an upper frame portion which forms a handle. The invention is a particular improvement over the prior art in respect to a construction which includes an arrangement of fabric covering forming a top parasol cover, an intermediate seat portion and a leg receiving portion all of which may be easily fastened or unfastened from the frame and which will all fold with the frame in order to facilitate carrying.

Accordingly it is an object of the invention to provide an improved baby carriage construction which includes an upper frame portion comprising spaced apart tubular members which converge toward the top and which are provided with U-shaped handles which may be rotated into a position forming a unitary U-shaped cane handle and which also includes a lower frame portion and a lower rear frame portion which carry the wheels at their lower ends and which are pivotable upwardly from the upper frame portion to collapse the baby carriage for carrying purposes and which also includes a fabric forming a top cover with an inner end which may be easily buttoned over the upper portion of the upper frame and which includes an U-shaped rigid frame-forming member which extends outwardly from the frame and which may be pivoted in respect thereto and which further includes a seat-forming portion which is also engaged over the frame and carries a seat portion which is slung to a rigid U-Shaped frame member which pivots inwardly and outwardly upon the collapsing and erecting of the frame structure, the carriage also including a lower foot receiving portion in a bag-like configuration which may be secured to the top cover portion.

A further object of the invention is to provide a carriage construction which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings:

FIG. 1 is a front, side perspective view of a baby carriage in the assembled condition and constructed in accordance with the invention;

FIGL 2 is a perspective view of the foot receiving portion of the baby carriage shown in FIG. 1;

FIG. 3 is a rear perspective view of the top cover portion or parasol of the baby carriage shown in FIG. 1;

FIG. 4 is an enlarged side, elevational view of the baby carriage shown in FIG. 1;

FIG. 5 is an elevational view similar to FIG. 4 but showing the baby carriage in the stage of being collapsed;

FIG. 6 is a side elevational view showing the baby carriage in a completely collapsed condition for carrying purposes; and FIG. 7 is a rear elevational view of the baby carriage which is partly folded.

GENERAL DESCRIPTION OF THE PREFERRED EMBODIMENT

Referring to the drawings in particular, the invention embodied therein comprises a baby carriage which includes an upper frame assembly made up of two spaced apart tubular members or rods 3 and 4 and a lower front frame assembly 1 and lower rear frame assembly 2 which include spaced apart rod members 1' and 1'' and 2' and 2'' which support axles 9 and 10 for wheels R and R' respectively.

The upper frame assembly 50 includes a convergent intermediate section 52 and an upper handle section 54 having separate handle elements 3a and 4a which are rotatably journalled on fittings P,P' at the upper ends of the respective rod members 3 and 4. The upper handle portion 54 is held together by a cross member 5.

The lower ends of the vertical rods 3 and 4 carry plates 8 which have fork members or hook elements $f$ which has one leg pivoted to the plate 8 and an opposite leg which is engageable over a projection 56 carried at the upper end of the lower front frame assembly 1 at a location above a bracket 58 which is also carried on the lower front frame assembly 1. The bracket 58 is pivoted on a pivot 3g secured to the lower end of the upper frame assembly 50. As shown in FIG. 5, when the fork member $f$ if moved inwardly, it releases the projection 56 and permits the collapsing pivotal movement of the lower front frame assembly $l$ and the lower rear frame assembly 2 about the pivot 3g. In addition, a triangular plate 2b is secured at 2a to the lower rear frame assembly 2 and it is pivoted at 1a to the lower front frame assembly 1. The plate 2b also carries a projection of pin 2c which engages with the leg of the fork member $f$ when the carriage is erected and the wheels R' are spaced rearwardly of the wheels R as indicated in FIGS. 1 and 4. Each of the tubular members or rods 2' and 2'' are formed with angled top ends which are engaged with a spring $m$. The spring $m$ has an opposite end engaged on a pin of the plate 2b so that the rear wheels have a spring mounting to minimize the shock of travel. The fork member $f$ may be shifted therefore, from a holding position in which the wheels R and R' are spread apart and support the carriage in an upright position for travel to a completely collapsed position in which case the hook member $f$ is released from the projection 2c and the lower front and rear frame assemblies 1 and 2 are pivoted upwardly against the upper frame portion or assembly generally designated 50.

A further feature of the construction is the provision of an inexpensive brake-like element F which comprises a cross member having U-shaped end portions which terminate in journals which extend into the respective rod members 2' and 2''. The construction provides an intermediate portion 60 which may be engaged by a foot of an operator to cause the end portions to bear against the wheels R' and act as a brake.

The baby carriage construction also includes a link 7 which is hinged at the plate 8 at one end and hinged at its opposite end to the inner end of a U-shaped support structure 6 which extends outwardly in a central area of the carriage in the erected condition. The support structure 6 is rotatable with the lower front and rear frame assemblies 1 and 2. The support plate 58 which is carried on the lower frame assembly 1 is pivoted at 3g to the lower end of the upper frame assembly 50. The arrangement is such that the pivotal movement may permit the complete collapsing of the two lower front and rear frame assemblies 1 and 2 against the upper frame assembly 50.

A further feature of the invention is that the frame elements are constructed to cooperate with collapsable body-forming portions made of fabric material. The body-forming portions include an upper cover or parasol part t, a central or seat forming part S and a lower or foot encompassing or receiving part c. The upper part t includes an opening at its top which is formed between two end flaps which are closable over the converging upper part 52 of the upper frame portion. The flap portions are folded together and secured together, for example, by snap fastening elements. In some cases this upper part may be sewn closed and the handle elements passed through the opening formed by the overlapped flaps as shown, for example in FIG. 7. The cover includes a rigid frame forming part 66 which is pivoted at its inner end within a slot 68 of the upper frame assembly 50 and which extends through the fabric of the covering t. When the rigid frame forming member 66 extends outwardly and downwardly from the upper frame assembly 50, it forms a cover as indicated in FIGS. 1 and 4.

The seat forming part S also includes a rigid frame forming part 6 which is secured at its inner end to the link 7 and which is pivoted at 1a to the lower front frame assembly 1. Since the element 7 is rotatable with respect to the vertical frame assembly 50, the rigidizing frame member 6 also extends or collapses along with the frame during erection and retraction. The seat forming portion S includes a rigid lower seat portion for supporting the baby and side portions which are engaged over the rigid frame forming member 6. The foot receiving portion c includes upwardly extending side panels or flaps c'' terminating in fastening elements C''' which engage with complimentarily fastening elements t' of the cover or parasol t. The seat element S also is secured to a rigid rod member 70 which extends between the rods 2' and 2'' by means of securement elements S'. An additional securement element or bracket 1 also secures the seat to the frame structure.

While specific embodiments of the invention have been shown and described in detail to illustrate the application of the principles of the invention, it will be understood that the invention may be embodied otherwise without departing from such principles.

What is claimed is:

1. A baby carriage, comprising an upper frame portion having two spaced apart upper legs converging upwardly and terminating in a handle, a lower frame portion having two spaced apart lower legs, a wheel axle extending between and journalled on said lower legs, said axle having front wheel means thereon, a lower rear frame having two spaced apart lower rear legs, a rear wheel axle extending between and journalled on said lower rear legs and having rear wheel means thereon, a rigid seat frame forming member having spaced apart leg portions pivoted on said lower frame and on said rear frame, bracket means carried on said lower frame adjacent to but spaced from the upper end of said lower frame and pivoted on said upper frame, plate means carried on the upper end of said lower rear frame and pivoted to the upper end of said lower frame and having a projecting pin thereon, a hook member pivoted on said upper frame and engageable with said pin to retain said lower frame and said lower rear frame in an extended operative position but releasing said frames for collapsible movement against said upper frame, a fabric seat assembly including a back portion engaged with said upper frame, a seat portion secured to the lower end of said back portion and having side parts engaged over said seat frame forming member, a top parasol cover including a back part secured over said upper frame and a top support extending outwardly from said upper frame and being pivoted to said upper frame to extend and retract said fabric cover therefrom, and a bottom foot receiver comprising a fabric bag secured to said lower frame and having an opening aligned with the front of said seat to receive the feet of the baby.

2. A baby carriage, according to claim 1, wherein said plate means comprises a triangular plate connected to said lower frame and being pivoted to said lower rear frame, said lower frame having a bracket secured thereto adjacent the upper end of said lower frame which is pivoted to the lower end of said upper frame, said top cover including an upper portion with an opening therethrough which is engaged over the upper portion of said upper frame, said seat-forming frame member comprising a U-shaped member having a leg at each side which is pivoted on respective legs of said upper frame.

3. A baby carriage, according to claim 1, including a link pivoted to said upper frame at its one end and having an opposite end pivoted to said seat-forming frame member, said seat-forming frame member being pivoted to said lower frame member.

4. A baby carriage, according to claim 1, including a brake member comprising a transverse rod having inwardly extending U-shaped ends which engage into respective tubular members of said lower frame, said transverse rod member having an intermediate foot engagement portion and end portions which are engageable on the rear wheels.

5. A baby carriage, according to claim 1, wherein said lower rear frame legs include angled upper ends and a spring connected between said angled upper ends and said plate means providing a spring mounting for said lower rear frame legs and said lower rear frame wheels.

6. A baby carriage comprising an upper frame portion having two spaced apart upper legs converging upwardly and terminating in an upwardly extending substantially parallel terminal leg ends, a pair of U-shaped handles each having first and second leg protions and a connecting web portion with the first leg portion of each handle being rotatably mounted in each terminal leg portion, a lower frame portion having two spaced apart lower legs a front wheel rotatably supported on each lower leg, a lower rear frame having at least one rear leg, a rear wheel rotatably supported on said rear leg, a rigid seat frame forming member having spaced apart leg portions pivoted on said lower frame and on said rear frame, bracket means carried on said lower frame adjacent to but spaced from said upper end thereof and pivoted on said upper frame, plate means carried on the upper end of said lower rear frame and pivoted to the upper end of said lower frame and having a projecting pin thereon, a hook member pivoted on said upper frame and engageable with said pin to retain said lower frame and said lower rear frame in an extended operative position but releasing said frames for collapsible movement against said upper frame, a fabric seat assembly including a back portion engaged with said upper frame, a seat portion secured to the lower end of said back portion and having side parts engaged over said seat forming frame member, a top parasol cover including a back part secured over said upper frame and a top support extending outwardly from said upper frame and being pivoted to said frame to extend and retract said fabric cover therefrom, and a bottom foot receiver comprising a fabric bag secured to said lower frame and having an opening aligned with the front of said seat to receive the feet of the baby.

7. A baby carriage according to claim 6, including spring means connected to said rear leg and resiliently supporting said rear wheel.

* * * * *